(12) United States Patent
Eberhardt et al.

(10) Patent No.: US 8,815,057 B2
(45) Date of Patent: Aug. 26, 2014

(54) PERFORATED FILM CLOTHING

(71) Applicant: Voith Patent GmbH, Heidenheim (DE)

(72) Inventors: Robert Eberhardt, Ellwangen (DE);
Michael Straub, Steinheim (DE);
Matthias Hoehsl, Heidenheim (DE);
Matthias Schmitt, München (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/769,498

(22) Filed: Feb. 18, 2013

(65) Prior Publication Data

US 2013/0153167 A1   Jun. 20, 2013

Related U.S. Application Data

(63) Continuation of application No. PCT/EP2011/064876, filed on Aug. 30, 2011.

(30) Foreign Application Priority Data

Sep. 1, 2010   (DE) .................... 10 2010 040 089

(51) Int. Cl.
   *D21F 1/10*   (2006.01)
(52) U.S. Cl.
   USPC ........................... 162/348; 162/903; 428/131
(58) Field of Classification Search
   CPC ........... D21F 1/0063; D21F 1/10; D21F 7/08; D21F 7/12; D21F 1/0027
   USPC ........... 162/116, 348, 358.2, 358.4, 306, 361, 162/362, 900–904; 428/131–140
   See application file for complete search history.

(56) References Cited

U.S. PATENT DOCUMENTS

| 3,121,660 | A | * | 2/1964 | Hall, Jr. ........................ 162/348 |
| 4,541,895 | A |   | 9/1985 | Albert |
| 5,837,102 | A | * | 11/1998 | Graf ............................. 162/296 |
| 8,454,800 | B2 | * | 6/2013 | Mourad et al. ................ 162/348 |
| 2010/0239814 | A1 |   | 9/2010 | Mourad et al. |

FOREIGN PATENT DOCUMENTS

| CA | 1 230 511 | 12/1987 |
| WO | 86/05219 A1 | 9/1986 |

OTHER PUBLICATIONS

Communication Via the Transmission of the International Search Report and the Written Opinion of the International Searching Authority dated Nov. 3, 2011 for International Application No. PCT/EP2011/064876 (11 pages).
English translation of International Search Report dated Nov. 3, 2011 for PCT/EP2011/064876 (4 pages).

* cited by examiner

*Primary Examiner* — Eric Hug
(74) *Attorney, Agent, or Firm* — Taylor IP, P.C.

(57) ABSTRACT

A fabric for a papermaking machine is configured as a belt, the two side edges of which are configured in each case as closed lines. Furthermore, the belt is formed in one layer from a solid material and has pores which form passages between the two surfaces of the belt. The belt has regions with a width of approximately 400 micrometers (μm) or less. These regions extend in the longitudinal direction over the entire circumference of the belt, transversely with respect to the side edges, and include no pores formed therein.

12 Claims, 3 Drawing Sheets

PERFORATED FILM CLOTHING

CROSS REFERENCE TO RELATED APPLICATIONS

This is a continuation of PCT application No. PCT/EP2011/064876, entitled "PERFORATED FILM CLOTHING", filed Aug. 30, 2011, which is incorporated herein by reference.

BACKGROUND OF THE INVENTION

1. Field of the Invention

The current invention relates to clothing for machines for the production of paper, and relates in particular to clothing for use in the forming section or dryer section of a paper machine.

2. Description of the Related Art

Papers of various types, cardboard and paper board are summarized under the generic term "paper". As a rule, the production of paper begins with the formation of a fibrous web from a fibrous stock suspension. Clothing is used in paper machines as a support for the suspension and for the not yet self-supporting fiber web. Clothing, as a rule is in the form of endless belts which, guided on rollers rotate within a certain section of the paper machine. In order to form a fiber web or fibrous material web, a fibrous stock suspension, which is placed onto the clothing in the forming section of a paper machine, is dewatered through the clothing. For the purpose of dewatering the clothing features passages through which water is removed from the fibrous stock suspension or respectively from the fibrous web which is being formed thereupon. Due to this screening effect, clothing utilized in the forming section for the purpose of forming the fibrous web is usually referred to as forming fabric.

Forming fabrics currently used in paper machinery consist of a woven material. Woven forming fabrics have a uniform structure with a basic pattern repeat. Woven forming fabrics are normally composed of several woven layers of different thread size and thread direction. Because of their different weave structure, the individual layers of such forming fabrics not only have water permeability deviating from each other, but because openings or passages in the upper layer are often covered by threads of woven layers beneath them, also lead to local lateral variations in the permeability of the woven forming fabric (the upper layer is hereby to be understood to be the paper side of the forming fabric, that is the woven layer upon which the fibrous stock suspension or fibrous web is supported). A laterally varying permeability results in a laterally varying dewatering velocity of the fibrous web which in turn leads to visible markings in the paper web and consequently to a poor paper quality, whereby the differently dewatered regions are manifested in a uniform arrangement due to the weave pattern. Lesser dewatered regions of a paper web can moreover have a lower fiber density.

Woven forming fabrics have a low flexural strength and therefore often have a tendency to wrinkle during rotation in paper machines. The use of monofilaments of various materials, for example a combination of polyethylene-terephthalate (PET) and polyamide (PA) on the running side of a clothing furthermore leads to forming fabric edges sticking up or protruding, due to the varying characteristics of these materials in regard to water retention, expansion, etc.

Clothing cannot be woven as an endless belt. To create an endless belt the two ends of the continuous long woven belt must be connected with each other. In order to avoid irregularities at the connection location which lead to marking the paper web, the connection occurs through a complicated woven seam structure which extends over a larger region. The complex production due to this is reflected in correspondingly high manufacturing costs.

As an alternative to woven clothing, forming fabrics which were produced from nonwoven materials were suggested. Patent specification CA 1 230 511 for example, cites a clothing which is formed from a laminate consisting of several layers of nonwoven water-impermeable materials into which openings for dewatering are introduced. Production of film laminates of this type in dimensions required for forming fabrics is however connected with high expenditure. Multi-layer film laminates of this type are moreover relatively rigid and have a tendency to delaminate under the conditions prevailing in the forming section of a paper machine. The previously outlined issues in regard to forming fabrics equally apply to clothing which is utilized in the dryer section of a paper machine.

What is needed in the art is a clothing capable of producing mostly mark-free paper which enables uniform dewatering of fibrous stock suspension or respectively fibrous web. Moreover, the clothing should have sufficient mechanical stability for economical use in a forming section and/or dryer section of a paper machine.

SUMMARY OF THE INVENTION

The present invention provides several embodiments of clothing for a paper machine in the form of a belt whose two side edges are configured in each case as endless lines. The belt is formed from a single layer solid material in which pores forming passages between the two surfaces of the belt are arranged. Moreover, the belt has regions wherein no pores are arranged. Each of these regions extends in a direction transverse to the side edges, in other words in the direction of travel of the belt over its entire circumference and has a width of approximately 400 micrometers ($\mu$m) or less transverse to the direction of travel of the belt.

Such perforated film-like clothing can be produced to be very thin, but nevertheless offers a high mechanical strength and stability. Since clothing of this type cannot be distorted diagonally, as is the case with woven materials, it also does not have a tendency to wrinkle. The film-like perforated clothing is particularly suitable for use as forming fabrics or dryer fabrics in paper machines.

In some embodiments of the film-like perforated clothing the width of the pore-free regions is, for example, less than 200 $\mu$m, or less than approximately 150 $\mu$m so that the width of the land strips formed by the circumferential regions can be adapted to the paper type to be produced on a paper machine and to the dewatering conditions prevailing in the section in which a respective clothing is utilized. For the production of clothing having a homogeneous permeability for water, the arrangement of the pores forms a uniform pattern in some embodiments of the belt. In other embodiments of the belt, the arrangement of pores deviates from that of a uniform pattern in order to avoid possible creation of marking patterns.

Particular embodiments of the belt according to the present invention are arranged so that the variation of the distance between every two immediately adjacent pores in the direction of rotation of the belt is at least 10% and a maximum of 60% of the average distance between the pores in the direction of rotation. In embodiments thereof the location of each pore is determined by a reference position and a deviation from the reference position, whereby reference positions of the pores form a uniform pattern and whereby the deviations from the respective reference position for at least two pores differ from each other. The embodiment of the inventive belt enables easily achieved homogeneous permeability and through the formation of a finally non-uniform pattern nevertheless avoids occurrence of marking patterns. In order to eliminate the occurrence of overlapping patterns, the deviation from the reference position for one pore is selected independently from the deviation from the reference position of any desired other pore within a predetermined area.

To ensure the mechanical strength of the belt in its entire pore region, the maximum deviation from the reference position in embodiments having the non-uniform pore arrangement is selected so that the reduction of the distance between two adjacent pore edges is a maximum of 60% of the distance provided by the reference positions. In variations thereof, the maximum deviation from the reference position is selected so that the reduction of the distance between the two adjacent pore edges is a maximum of 30%, for example a maximum of 10% of the distance between the pore edges provided by the reference position. Moreover, in variations having pore arrangements deviating from a uniform pattern, the maximum variation of the distance between two adjacent pores is selected so that the width of a pore-free region reduces by 25% at most, relative to a reference value for the width.

In variations of the belt the pore structure encompasses the entire surface of the belt, thereby enabling uniform dewatering over the entire clothing. In other variations the belt has a pore-free edge zone along the side edges in order to minimize the risk of potential tears. In such embodiments of the belt according to the present invention, the pore-free edge zone has a width in the range of approximately 1 to 5 cm.

For structuring a fibrous web which is to be produced, for example to introduce areas with higher or lower fiber density, or to introduce water marks, the belt features a region with a first pore structure and at least one additional region with an additional pore structure, whereby the pore structure of the first region deviates at least in its porosity from that of an additional region.

The solid material used to form the film-like belt is provided, for example, by a polymeric material. The polymeric material is selected from polyethylene terephthalate (PET), polyethylene napthalate (PEN), polyphenylene sulfide (PPS), polyether ether ketone (PEEK), polyimide (PI) or polyolefine. To adjust special characteristics of the belt used to form the clothing, fillers may be embedded in the polymeric material, whereby the fillers may be in the embodiment of particles as well as fibers or a mixture of both.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
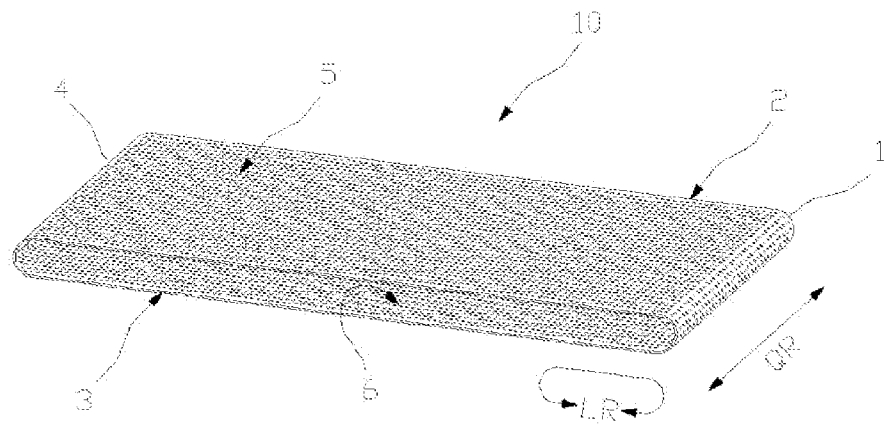
FIG. 1 is a schematic depiction of perforated film clothing according to the present invention.

Referring now to the drawings, and more particularly to FIG. 1, there is shown a schematic depiction of perforated clothing 10. The clothing consists of belt 1 which is laterally defined by two side edges 2 and 3, each of which follows an endless line, and therefore has no end. Accordingly, belt 10 in itself is also endless and is produced as a so-called endless belt. Besides side edges 2 and 3, belt 1 is also defined by two surfaces 5 and 6 arranged opposite each other. Surface 6 of belt 1 facing into itself forms the inside of the clothing and as a rule is used to transfer forces for the rotation of the belt. Opposite surface 5 located opposite, and facing outward in FIG. 1 normally serves as a support for the fibrous stock suspension or respectively for the fibrous web. Direction QR provided by the width expansion of belt 1 is hereafter referred to as cross direction and is consistent with the cross machine direction when utilizing the clothing in a paper machine. Rotation of clothing 10 occurs transversely hereto, in the direction referred to as longitudinal direction or direction of travel LR, whereby the special progression for the clothing is depicted in FIG. 1.

In order to form porous clothing 10, belt 1 has a multitude of holes 4. As can be seen in the schematic depictions of a cross section through a section of belt 1 in FIGS. 2a and 2b, each of holes 4 forms a passage from outer surface 5 of the belt to its inside surface 6. Subsequently these holes are also referred to as pores which serve to dewater a fibrous material supported on the belt during the production of paper.

Deviant from the schematic illustration in FIG. 1, the edge regions of some embodiments of clothing 10 have no pores or perforations in order to thereby achieve a higher stability of the clothing according to the present invention, and in order to counter possible tearing of the clothing while being used as a forming fabric or dryer fabric. The width of such non-perforated side edge zones normally is in the region of between approximately 1 to 5 centimeters (cm).

Figure 2A:
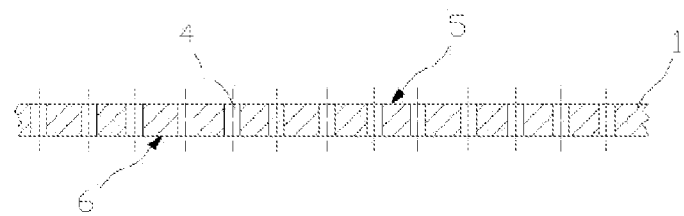
FIG. 2a is a cross sectional view through a section of perforated film clothing according to the present invention with pores having a uniform cross section.
Figure 2B:
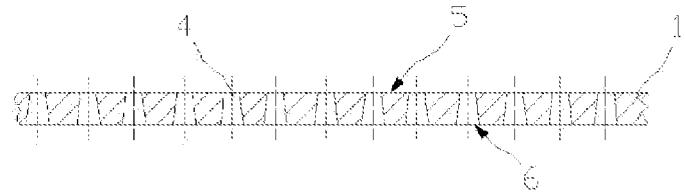
FIG. 2b is a schematic cross sectional view through a section of a perforated film clothing according to the present invention with conical pores.

As illustrated in FIG. 2a, the hole shapes of pores 4 may have a cross section which does not change between surfaces 5 and 6 of belt 1, but may also have a cross section widening in the direction of back surface 6 which is being used as a support for the fibrous web, as illustrated in FIG. 2b. In special clothing the pore cross section may however also taper toward the back surface of the belt. In the case of round cross sectional shapes therefore, cylindrical or conical hole shapes result. Besides pores having round cross sectional geometries, pores having elliptical cross sections may also be used in some embodiments of clothing 10. Moreover, pores 4 may be in the form of an elongated hole or slot, or may have any desired cross section, for example triangular, rectangular, cross or star shaped or similar geometries.

In the case of pores having a round cross section, diameters of between approximately 50 to 250 μm may be present in some embodiments of the clothing according to the present invention. With conical versions of the pores, this dimension relates to the pore size at surface 5 of belt 1 which is intended to support the fiber web or fibrous stock suspension. On opposite surface 6, the pores can have larger diameters to thereby accelerate the dewatering of the fibrous material. If pores 4 with elliptical cross sections, or pores which are configured as an elongated hole, or which have a rectangular cross section are used, then the shorter extension of these cross sectional geometries (hole width) has a value of between approximately 50 to 250 μm and the larger extension (hole length) has a value of, for example between approximately 100 to 800 μm in some embodiments, whereby the hole length is always greater than the hole width. In clothing 10, diameters of 80 to 160 μm or hole widths of 60 to 160 μm, and hole lengths of 120 to 400 μm are feasible. The longitudinal axes of elliptical or slot or longitudinal hole cross sections are, for example, aligned in direction of travel LR of the clothing, but in some embodiments may also be aligned up to 45 degrees thereto.

During use in paper machines the clothing is subjected to high tensile stress in direction of travel LR. In order to ensure sufficient mechanical stability of clothing 10 under these conditions, belt 1 is equipped with strip-like areas 8 whose longitudinal direction is oriented in direction of travel LR of the clothing and inside of which no pores are arranged. Strip-like areas 8 which are also referred to as "land strips" in this document are visualized in FIG. 3 by their edge areas which are highlighted by a dotted line.

The width of the land strips is, for example, uniform in some embodiments of the present invention but may also vary in other embodiments, whereby the variation of the land strip width does not, for example, exceed 25% relative to a reference value. The reference values may be determined depending upon area of application of the clothing in the paper machine, for example in the dryer or forming section, but possibly in addition also according to the type of paper to be produced respectively. Examples for reference values are an average land strip width and a minimum land strip width, or also a maximum land strip width.

The average land strip width is, for example, less than 400 μm and for clothing intended for finer paper types such as for example writing papers, for example less than 200 μm, whereby average land strip widths of less than 150 μm are feasible in regard to the production of papers having an as homogeneous as possible fiber density without visible dewatering markings. With the cited land strip widths sufficient lateral dewatering takes place over adjacent pores, so that no visible dewatering markings occur.

The arrangement of pores 4 of belt 1 occurs, for example, according to a predetermined arrangement specification. Depending upon the particular application the arrangement specification may define a uniform or non-uniform pattern, or even in certain areas of the belt uniform distribution of the pores with stochastically independently defined pore position. In certain embodiments of clothing 10, the arrangement specification determines the pore locations on belt 1 in regard to a uniform pattern, whereby the actual location of a pore may deviate from the reference position defined by the uniform pattern.

Figure 3:
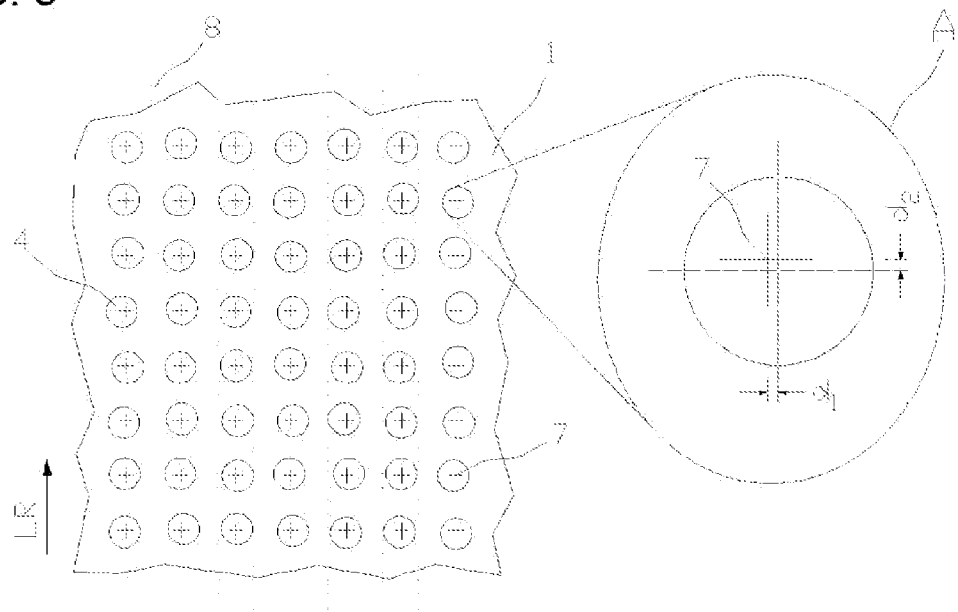
FIG. 3 is a schematic depiction of a top view onto a section of a perforated film clothing according to the present invention which is overlaid by a cross pattern.

An example for a pertinent pore arrangement is illustrated in FIG. 3. The basis of the arrangement is a uniform pattern of reference positions 7, which are identified in the drawing with crosses "+". The pore locations themselves correspond with the centers of the circular holes in the illustrated example and deviate on some pores from the respectively allocated reference position 7 by an individual value whose components $d_1$ in the direction of travel and $d_2$ in the cross direction of the clothing are illustrated in detailed A in FIG. 3. The arrangement specification for the pore's position in this case for the direction of travel LR of belt 1 is $$P_{iL}=P_{i0L}+d_{i1};$$

and for cross direction QR of belt 1

$$P_{iQ}=P_{i0Q}+d_{i2};$$

whereby i describes the running variable allocated to the respective pore, (y=L y=Q) $P_{iy}$ the actual position of pore i, $P_{i0Q}$ its reference position 7 in the uniform pattern and $d_{iz}$ (z=1; 2) the deviation from reference position 7. Deviation $d_{iz}$ from the reference position is provided by $$d_{iz}=k_{iy} \cdot dP_{iy};$$

wherein $dP_{iy}$ reflects the maximum permissible deviation from reference position 7 and $k_{iy}[-1, -a_1] [a_1, 1]$; with $a_1$ R and $a_1 \geq 0$.

For $a_1=0$ several of the actual pore position $P_{iL}$ may also coincide with their respective reference positions $P_{i0L}$. For $a_1 \neq 0$ none of the actual pore positions coincide with their respective reference positions 7. The maximum deviations from the reference positions are determined through values $dP_{iL}$ and $dP_{iQ}$, so that abutting or overlapping of pores or improper constrictions of land strips through the pore holes can be avoided. $dP_{iQ}$ in particular should be selected so that narrowing of a land strip segment through a pore does not, or at least not significantly exceed 25% of its nominal width. Moreover $dP_{iL}$ and $dP_{iQ}$ can be selected so that the maximum variation of the distance between two respectively adjacent pores amounts to a certain percentage of a predetermined or average distance. The values for the maximum permissible variation can be selected from a range of 10 to a maximum of approximately 60%, for example from the range of 10 to a maximum of 50%, whereby the pore size and distance represent essential criteria for the determination of the selection. The distance between two adjacent pores is to be understood to be the distance between the edges of the pores.

To calculate actual pore positions, the values for $k_{iy}$ can be selected from a predetermined number of values $\{k_{iyj}\}$, whereby the sequence of the selection of values is changed, for example when all values of the number have been selected once or repeatedly. The values may be selected so that no accumulation of the values occurs by certain numerical values from the above cited interval(s). By changing the sequence in which the values are selected after single or repeated use of the set of values, formation of overlapping patterns which could possible lead to an optically visible dewatering marking can be avoided. In other embodiments of the inventive clothing the individual values for $k_{iy}$ are produced in real time for use in a pseudo-random generator or random number generator whereby the latter can for example use the noise signal of a resistor to determine the random numbers. An arrangement specification for pore positions according to one of the above equations (1) through (3) enables the production of porous clothing with precisely defined permeability by avoiding strictly uniform dewatering structures which are unavoidable with woven clothing.

Defined permeability can also be achieved with uniform pore arrangements. With such arrangements it is, however, important that these pattern arrangements include land strips whose longitudinal extension coincides with the direction of travel of clothing 10 and that no pores are arranged in the land strips.

Examples for uniform arrangements of pore patterns are schematically illustrated in FIGS. 4 to 8. These Figs. merely show segments for the purpose of characterization of the arrangement of pore patterns.

Figure 4:
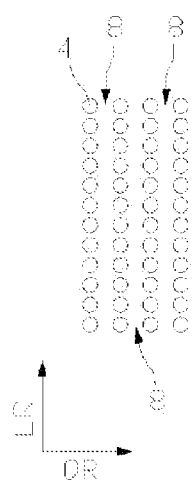
FIG. 4 is a pore arrangement according to a first embodiment of the clothing according to the present invention.
Figure 5:
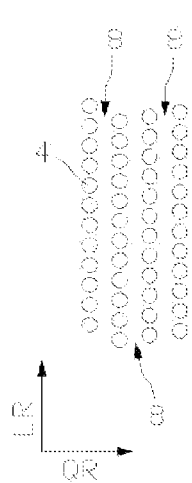
FIG. 5 is a pore arrangement according to a second embodiment of the clothing according to the present invention.
Figure 6:
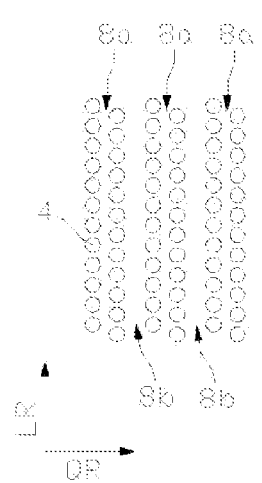
FIG. 6 is a pore arrangement according to a third embodiment of the clothing according to the present invention.

FIG. 4 illustrates one possible arrangement of round pores 4, arranged in parallel rows. Rows of pores are oriented in direction of travel LR of the clothing, and transverse to the direction of travel are located at a distance from each other which defines land strip 8, as described above. FIG. 5 illustrates a variation of the pore arrangement in FIG. 4. Instead of being positioned next to each other, the pores of adjacent rows of pores in this example are offset from each other in the direction of travel by less than one pore distance. As is the case in the example in FIG. 4 land strips 8 between the rows of pores have the same widths. The example illustrated in FIG. 6 is different. Here, every other land strip 8b is wider than land strip 8a. A pore arrangement of this type can of course also have several different land strip widths, just like a sequence of several land strips of a first width and one or several land strips of a second width and possible other widths is possible.

Figure 7:
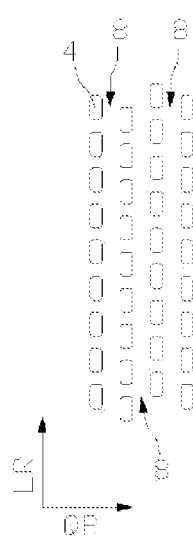
FIG. 7 is a pore arrangement according to a fourth embodiment of the clothing according to the present invention.
Figure 8:
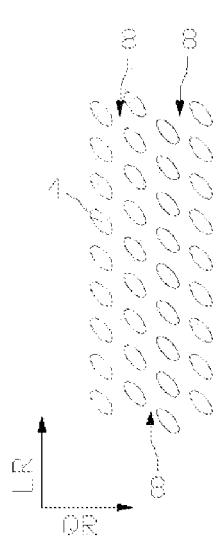
FIG. 8 is a pore arrangement according to a fifth embodiment of the clothing according to the present invention.
Figure 9:
FIG. 9 is a pore arrangement according to sixth embodiment of the clothing according to the present invention.

FIGS. 7 to 9 illustrate the pore arrangements depicted in FIGS. 5 to 6 with respectively different hole shapes. Pores 4 of the arrangement in FIG. 7 have a rectangular cross section with rounded corners. Pores 4 are arranged in rows which are located at uniform distances from each other so that the width of all land strips 8 is identical in cross direction QR. In direction of travel LR of the belt the rows are offset from each other by a fraction of the pore distances from each other. In contrast to the pore pattern in FIG. 7, the cross sections of the pores in the example in FIG. 8 are elliptical, whereby the longitudinal axis of the elliptical pore shapes in the illustrated example is arranged 40° tilted relative to the direction of travel. The pores in the embodiment of the inventive clothing illustrated in FIG. 9 are also elliptical, whereby the individual pores are separated from each other by land strip 8a and 8b which have different widths. The tilting of the long elliptical main axes of two rows of pores which are separated by narrow land strip 8a progresses minor-symmetrical to the land strip orientation in the illustrated example. Deviations of the pore distances are possible. These should however not exceed 10 percent (%) of the space between the holes representing the pores and should not lead to a narrowing of the land strips exceeding 25% of the reference value determining same. Within certain areas, for example in a surface area of 10×10 square centimeters (cm²), the average pore distance should to a large extent be constant.

Depending on the scope of the application of clothing 10, for example in the forming or dryer section of a paper machine, and depending upon the type and grade of paper to be produced, clothing 10 has a porosity, for example, in the range of 5 to 30 percent. Porosity is hereby understood to be the ratio of the surface occupied by the pores on side 5 serving as the support side for the fibrous web relative to the overall surface of side 5. Clothing having a porosity, for example, in the range of 10 to 25 percent is feasible. The air permeability of clothing 10 is advantageously in the range of approximately 80 to approximately 800 cfm (cubic feet per minute, 1 cfm=1.699 cubic meters per hour (m³/h)), for example, in the range of approximately 200 to approximately 500 cfm.

In one embodiment of the inventive clothing not illustrated in the drawings, the pores are arranged in a stochastically independent, but nevertheless statistically uniform distribution between land strips 8. An arrangement of this type may occur through calculation of the pore positions on clothing 10 by using a random number generator, whereby for an embodiment of the inventive clothing an algorithm is advantageously used which ensures minimum distances between the individual pores, in other words it avoids overlapping of pores. Another possibility to produce a stochastically independent pore distribution is offered by utilization of physical methods, for example ion bombardment or a similar method resulting in clearance holes in the material damaged along the trajectories.

In addition to water permeability of clothing 10, dewatering of a fibrous web carried on clothing 10 is also influenced by other components in a paper machine, for example by vacuum suction devices or dryer cylinders heated by steam. Uneven distribution of pressure or temperature in these components in the cross machine direction cause uneven dewatering velocities in the fibrous web in cross direction QR of clothing 10. In order to compensate for such differences, the porosities of clothing 10 have a predefined profile in cross direction QR. If, for example steam heated rolls are used in the dryer section of a paper machine to dry the fiber web, the drying effect of these rolls is generally less in the edge regions of the fiber web than in its center regions because the rolls cool off more rapidly on the side surfaces. Accordingly, clothing 10 is used in this section whose porosity increases constantly toward the edges of the belt 1. This can be achieved through increasing the density of pores by changing the distance between pores and/or distance between pore rows by increasing the pore cross sections, or through a combination of both design parameters.

In some instances, targeted dewatering marks are placed in the fibrous web, for example to create a water mark or to provide a certain texture in the paper. For these applications the areas of clothing 10 which serve to carry the marks have a different, generally lower porosity than remaining areas. The change in porosity is hereby accomplished through a change in the pore cross sections and/or pore distances within the areas between land strips 8 in order to not negatively impact the mechanical stability of the clothing.

Clothing 10 consists of single layer solid material in order to prevent delamination of belt components during use in a paper machine. Solid materials are understood to be homogeneous materials as well as composite materials, whereby in this document laminates are not included under the term of composite material. An exemplary material for single layer belt 1 is an organic polymer or a mixture of organic polymeric materials. To allow for simple bonding of the material and placing of pores by means of laser welding, materials having good absorption characteristics in the infrared range are, for example, utilized. Exemplary polymers for the production of belt 1 are thermoplastic synthetic materials, for example polyethylene-terephthalate (PET), polyethylene-naphthalate (PEN), polyphenylene-sulfide (PPS), polyetheretherketone (PEEK), polyolefin and polyimide (PI).

In addition to the polymer or the polymer blend, the material can moreover contain additives by means of which the characteristics of the belt are adjusted. Organic and/or non-organic fillers, glass, carbon, processing aids and similar materials with which the abrasion resistance, hardness, elasticity, tear resistance and many other parameters of belt 1 can be adjusted are suited as additives. The additives may be added into the material in the form of additions to the polymers, in the form of micro- and/or nanoparticles or fine or short fibers. Fibers are suited to achieve high mechanical stabilities and tear strengths, whereby carbon fibers of belt 1 additionally provide anti-static characteristics. The portion of additives in the belt material can be as much as 35%. The belt is, for example, film-like having a thickness of approximately 1200 µm or less, 600 µm or less, or 500 µm or less.

Endless belts 1 may be used as clothing 10. Clothing having widths of up to 12 meters (m) are currently used in the paper producing industry. In order to produce such wide and even wider clothing 10, several endless belts 1 are welded to each other. The individual endless belts have widths, for example, in the range of 0.5 to 4 meters.

In place of endless belts, open ended belts may also be used, that is belts whose side edges are not configured as closed lines. According to a first method a belt of this type is arranged similar to a winding so that the first side edge of a winding of the belt connects to the second side edge of the prior winding of the belt and subsequently welds together at the adjoining side edges. The alignment of the belt and its welding can occur successively or continuously successively, so that joining of the side edges and their welding occurs only over a shorter length. In this process, use of narrower belts having widths of approximately 35 centimeters (cm) to approximately 1 m is feasible. Irrespective of the width of clothing 10, the width of the belt depends also on the length of clothing 10 (in the direction of travel) whereby for longer clothing wider belts may be used than for shorter clothing.

In another method the ends of a belt, in other words its edges oriented transverse to the direction of travel, are welded together to form a clothing. This allows in particular use of pre-manufactured, however not endless belts, for example polyethylene-terephthalate belts.

Figure 10:
FIG. 10 is a welded seam connection according to a further embodiment of the clothing according to the present invention.
Figure 11:
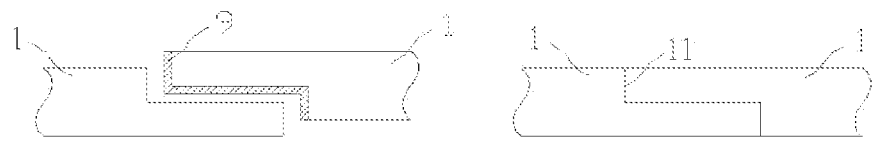
FIG. 11 is a welded seam connection according to a further embodiment of the clothing according to the present invention.
Figure 12:
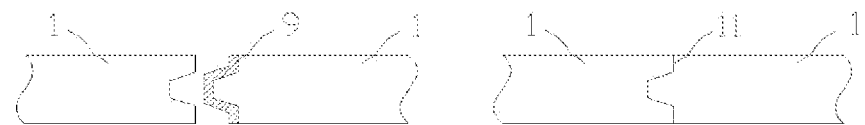
FIG. 12 is a welded seam connection according to an additional embodiment of the clothing according to the present invention.

Welding of the belt or belts occurs, for example, by laser or ultrasound. The belts can be welded edge-to-edge and can subsequently be leveled through grinding or polishing, for example with ultrasound in order to achieve a homogeneous belt surface. Alternatively the belts can also be overlap welded and subsequently leveled. Effective welding can be achieved through beveling or profiling of the abutting edges. Examples for accordingly processed belt edges are shown in FIGS. 10, 11 and 12 respectively in non-joined (left) and joined (right) state. FIG. 10 shows a side view of the two opposite ends of belt 1. If the belt material does not possess sufficient absorption of the energy form used for welding, then one (as shown in the illustrated example) or both (not illustrated) end faces of the edges can be provided with absorption layer 9 (crosshatched in illustration). After welding both end faces are connected with each other on joint surface 11.

In contrast to the beveled variation according to FIG. 10, the two belt ends in the example illustrated in FIG. 11 have a mutually complimentary stepped profiling. Absorption layer 9 for better joining of the ends may also be used in this case on the joint surface. An additional example of a joint edge profile is shown in FIG. 12. In this embodiment of the inventive clothing the edges of belt 1 which are to be joined are pre-machined in the form of a complimentary tongue and groove profile, whereby tongue and groove are, for example, provided with a slight taper as shown, in order to facilitate insertion. This type of profile distinguishes itself in particular through great security in regard to unintended vertical offset of the two belt ends during the connection process. As in previous cases, absorption layer 9 may also be applied here onto one or both joint edges of the belt ends in order to facilitate joining of the belt ends through welding. This applies especially when using NIR-lasers (NIR: near infrared) whereby, for example, NIR-absorbers are used as absorption layer 9 in the near infrared. Instead of an absorption layer, a second laser or an intensive light source whose wavelength is well absorbed by the belt material may also be used. This second laser or light source pre-heat the seam location to such an extent that the wavelength of the simultaneously or subsequently irradiating welding laser can be better absorbed and thereby better utilized.

The belt material may be stretched in the direction of travel—in additional embodiments stretched in the direction of travel as well as transversely to the direction of travel—in order to minimize expansion of the clothing during operation. Stretching can occur prior to welding of the belt or belts into clothing 10. With welding seams progressing transversely to the direction of travel, the belts are, for example, stretched again subsequent to the welding process. For example, at least longitudinal stretching occurs after welding of the belt or belts into clothing.

Pores 4 may be placed into belts 1 by a laser whose emission wavelength is sufficiently absorbed by the belt material. For the above referenced belt materials a $CO_2$-laser having an emission wavelength in the average infrared range of nominally 10.6 µm is suitable. To form the pores, an optical axis of the laser beam is guided over belt 1, or the belt is moved transversely to the optical axis of the laser beam. Hole cross section, hole distance, distance of hole rows and hole shapes of pores 4 can be adjusted through the distance, the utilized laser optics, intensity of the light beam, laser pulse duration, laser pulse frequency, speed of belt relative to optical axis of laser beam and similar parameters. With this type of "laser drilling" fused edges may form at the hole edges of the pores, which may either be left as is, or ground down.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A clothing for a paper machine, the clothing comprising:
a belt having two side edges, each of said two side edges being configured as endless lines, said belt being formed from a single layer solid material formed by a polymeric material and a plurality of fillers embedded in said polymeric material, said polymeric material being one of polyethylene terephthalate (PET), polyethylene naphthalate (PEN), polyphenylene sulfide (PPS), polyether ether ketone (PEEK), polyimide (PI) and polyolefin and said plurality of fillers including at least one of particles and fibers, wherein a plurality of pores are arranged in said single layer solid material, said arrangement of said plurality of pores deviating from a uniform pattern such that a variation of a distance between every two immediately adjacent pores of said plurality of pores in a direction of rotation of said belt is at least 10% of an average distance between said plurality of pores in said direction of rotation and a maximum of approximately 60% of said average distance between said plurality of pores in said direction of rotation, said plurality of pores being configured to form a plurality of passages between a pair of opposing surfaces of said belt, said belt being one of a unidirectional film belt and a bidirectional film belt, said belt including a plurality of regions having a width of approximately 400 micrometers (μm) or less extending in a longitudinal direction over an entire circumference of said belt transversely to said two side edges, said plurality of regions including none of said pores.

2. The clothing according to claim 1, wherein said width of said plurality of regions including no pores is less than approximately 200 μm.

3. The clothing according to claim 2, wherein said width of said plurality of regions including no pores is less than approximately 150 μm.

4. The clothing according to claim 1, wherein a position of each pore of said plurality of pores is determined by a reference position and a deviation from said reference position, said reference positions of said plurality of pores forming a uniform pattern and said deviations from said reference positions vary from each other for at least two pores of said plurality of pores.

5. The clothing according to claim 1, wherein a deviation from a reference position for one of said plurality of pores is selected independently from a deviation from a reference position of any other pore of said plurality of pores in a predetermined area.

6. The clothing according to claim 5, wherein a maximum deviation from said reference position for said pore is selected so that a reduction of a distance between edges of two adjacent pores of said plurality of pores is a maximum of approximately 60% of a distance provided by said reference positions.

7. The clothing according to claim 6, wherein said maximum deviation from said reference position is selected so that said reduction of said distance between two adjacent pore edges is a maximum of 30% of said distance provided by said reference position.

8. The clothing according to claim 7, wherein said maximum deviation from said reference position is selected so that said reduction of said distance between two adjacent pore edges is a maximum of 10% of said distance provided by said reference position.

9. The clothing according to claim 8, wherein a maximum variation of said distance between two pores is selected so that a width of a pore-free region reduces by a maximum of approximately 25% relative to a reference value for said width of said pore-free region.

10. The clothing according to claim 1, wherein a pore structure encompasses an entire surface of said belt.

11. The clothing according to claim 1, wherein said belt includes a region with a first pore structure and at least one additional region with an additional pore structure, said pore structure of said first region deviating at least in porosity from that of said additional pore structure.

12. A clothing for a paper machine, the clothing comprising:
a belt having two side edges, each of said two side edges being configured as endless lines, said belt being formed from a single layer solid material in which a plurality of pores are arranged, said plurality of pores being configured to form a plurality of passages between a pair of opposing surfaces of said belt, said belt including a plurality of regions having a width of approximately 400 micrometers (μm) or less extending in a longitudinal direction over an entire circumference of said belt transversely to said two side edges, said plurality of regions including none of said pores, an arrangement of said plurality of pores deviating from a uniform pattern, wherein a variation of a distance between every two immediately adjacent pores of said plurality of pores in a direction of rotation of said belt is at least 10% of an average distance between said plurality of pores in said direction of rotation and a maximum of approximately 60% of said average distance between said plurality of pores in said direction of rotation.

* * * * *